United States Patent [19]

Ise

[11] Patent Number: 4,865,301

[45] Date of Patent: Sep. 12, 1989

[54] APPARATUS FOR HANDLING WORKPIECES

[75] Inventor: Yoji Ise, Tokyo, Japan

[73] Assignee: Kabushiki Kaisha Myotoku, Tokyo, Japan

[21] Appl. No.: 162,092

[22] Filed: Feb. 29, 1988

[51] Int. Cl.[4] ............................................. B23Q 3/06
[52] U.S. Cl. .................................................... 269/34
[58] Field of Search ...................... 269/34, 33, 32, 27, 269/227

[56] References Cited

U.S. PATENT DOCUMENTS 4,362,261 12/1982 Cook ..................................... 269/34

FOREIGN PATENT DOCUMENTS 1257813  2/1961  France ................................. 269/34
55-144947 11/1980 Japan ................................... 269/34
 383290 12/1964 Switzerland ......................... 269/34
 994201  2/1983 U.S.S.R. .............................. 269/34

Primary Examiner—Robert C. Watson
Attorney, Agent, or Firm—Bauer & Schaffer

[57] ABSTRACT

Workpieces are gripped by a pair of jaws having rear end parts contained within a housing. A single pinion borne within the housing meshes with racks formed on the rear end parts and the jaws are synchronized to operate in opposition to each other.

4 Claims, 3 Drawing Sheets

APPARATUS FOR HANDLING WORKPIECES

FIELD OF THE INVENTION

This invention relates to apparatus for handling workpieces and in particular, to gripping apparatus used in various automatic machines.

BACKGROUND OF THE INVENTION

The applicant has already provided a gripping apparatus of this kind wherein rear end parts of respective gripping jaws are contained within a housing and pinions borne within the housing and pinions borne within the housing are meshed with racks formed on the above mentioned rear end parts. The gripping jaws are synchronized to operate in opposition to each other. (For example, see Japanese Utility Model application laid open No. 58044/1986.)

In the above mentioned apparatus, the racks are formed on the rear end surfaces of respective gripping pawls, and are made to form the same plane. The pinions mesh respectively, in opposition to each other, with the respective racks and mesh also with each other. Therefore there are defects in at least the three meshing parts. The backlash is large and the degree of precision in controlling the gripping operation can not be elevated. Also, there have been defects arising from the requirement for two pinions which causes the apparatus to be uneconomical and can not be reduced in size. Further, defects occur when the respective racks are made to form the same plane as described above, in that the width dimension of the apparatus must be made larger than at least the total of the lengths of the respective racks. As a result, the contour of the apparatus becomes too wide so that even in this sense, the apparatus can not be made small.

BRIEF SUMMARY OF THE INVENTION

The present invention has it as an object, the provision of gripping apparatus which is highly efficient in the gripping operation, is precise in controlling the workpiece, is economical and can be made small.

According to the present invention, gripping apparatus is provided wherein the rear end parts of respective gripping pawls are contained within a housing. A single pinion, borne within the housing, meshes with racks formed on each of the rear end parts. In this manner, the jaws are synchronized to operate in opposition to each other, by providing only a single pinion between confronting racks.

According to the present invention, as the respective racks are opposed to each other and have one pinion interposed between them, when one jaw element moves the single pinion will rotate, so that the other jaw element will be directly moved in the reverse direction. Thus, the respective jaw element will be synchronized to operate in opposition to each other as in the above mentioned conventional appartus. That is to say, the gripping pawls will slide symmetrically.

According to the present invention, as distinguished from the afore-mentioned conventional apparatus, there are as few as two meshing parts, that is, one between one rack and the above mentioned one pinion and one between the other rack and the above mentioned one pinion, therefore producing advantages in reducing backlash and increasing precision of the gripping operation.

Also, according to the present invention, as distinguished from the afore-mentioned conventional apparatus, only a single pinion is required and therefore advantages in economy and in size are produced.

Further, according to the present invention, the respective racks are opposed to each other and are not arranged in the same plane. Therefore it is advantageous that, though the thickness of the apparatus increases, the width of the apparatus can be made narrower and, thus, in this sense, the apparatus can be made small.

DETAILED DESCRIPTION OF THE INVENTION

Figure 1:
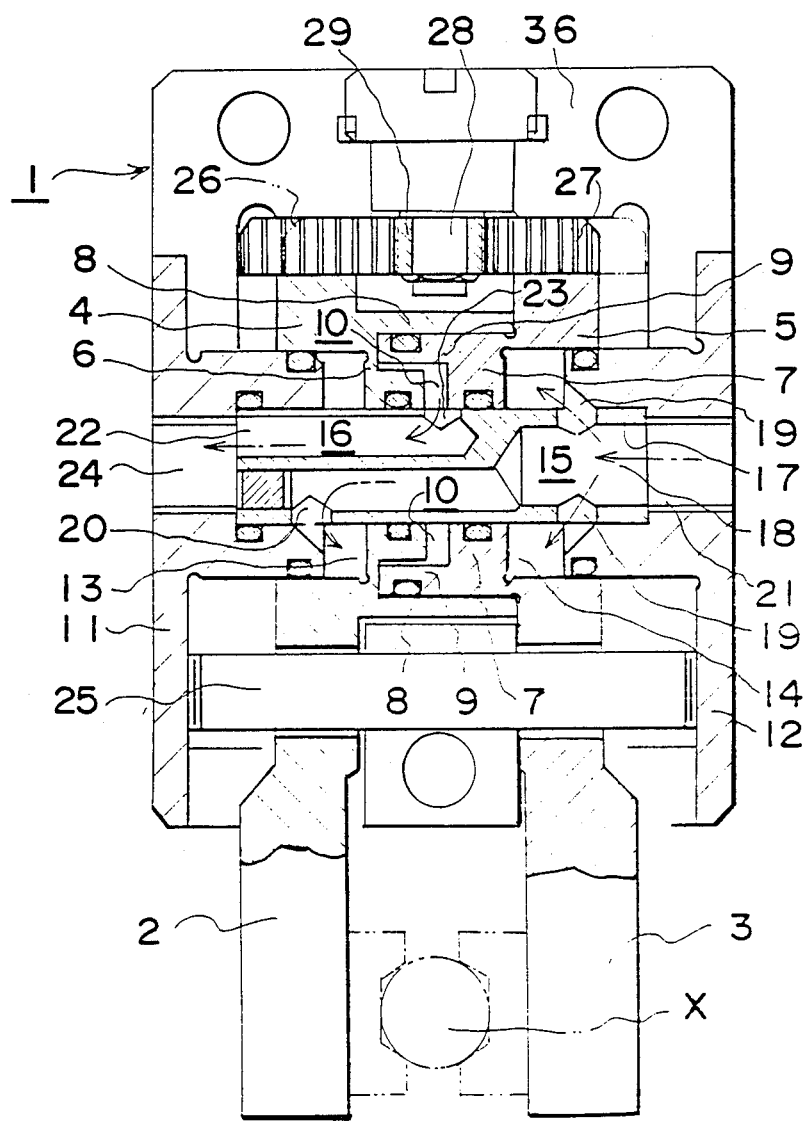
FIG. 1 is a vertical cross-sectioned view showing a gripping apparatus in accordance with the present invention, as in gripping a workpiece.

The present invention shall be explained in the following on the basis of an embodiment shown in FIGS. 1 to 3.

Though not illustrated in detail, the gripping apparatus 1 of the present invention is movably fitted to the end of a movable control rod, shaft, or the like of an automatic machine chuck so as to grasp and convey from place to place a workpiece.

The gripping apparatus 1 of the present invention comprises a two fingered jaw held within a housing 36. The jaw is formed of outer parts 2 and 3 which extend forwardly out of the housing 36 and inner parts 4 and 5 which are movably held in the housing 36 so as to operate in opposition to each other. In the illustrated embodiment, each of the jaw elements 2 and 3 are operated in opposition to each other pneumatically as hereinafter explained.

The inner parts 4 and 5 and the outer parts 2 and 3 are integrally connected by confronting disk shaped piston means 6 and 7 from which extend in overlapping sliding relationship ring-like flanges 8 and 9. The flanges 8 and 9 form a cylinder by fitting with each other inward from the peripheries of the pistons 6 and 7 to define an intermediate compartment 10 along their central axis. The housing 36 is provided with caps 11 and 12 which enclose the exterior sides of the pistons 6 and 7 to form side cylinder compartments 13 and 14, in which the pistons may move. Suitable seal rings are provided between the sliding surfaces to render the compartments fluid tight.

Air passages 15 and 16 formed within a chambered guide shaft 17, set in the compartment 10, communicate respectively with both side compartments 13 and 14. That is to say, the guide shaft 17 extends through the center of the pistons 6 and 7 while the passage 15 communicates with both side compartments 13 and 14 through a bore 18 and holes 19 and 20 provided via an inlet/outlet port 21 in the cap 12. The passage 16 communicates through a bore 22 and a single hole 23 with an inlet/outlet port 24 provided in the cap 11. By the way, in the manufacture, the body 36 is formed of two parts, into which the gripping pawls 2 and 3 are set and then the body parts may be integrally formed together.

A guide shaft 25 is provided at the front end to guide the pawls 2 and 3.

In the illustrated embodiment, when a workpiece is to be gripped, pressurized air is fed against the faces of both side compartments 13 and 14 through the air passage 15. Since the intermediate compartment 10 is opened to the atmosphere through the air passage hole 16, the air pressure thus applied to the faces of the pistons 6 and 7 cause the jaw element 2 and 3 to be slide inward, closing about the workpiece X so that it is gripped as shown in FIG. 1.

When the workpiece X is to be released, both side compartments 13 and 14 are opened to the atmosphere through the passage 15 and air is fed to the intermediate compartment 10 through the air passage 16. As a result, a shown in FIG. 2, air pressure will be applied in the reverse direction onto the pistons 6 and 7 forcing them apart and the jaw elements 2 and 3 will slide outwardly releasing the workpiece X.

Figure 2:
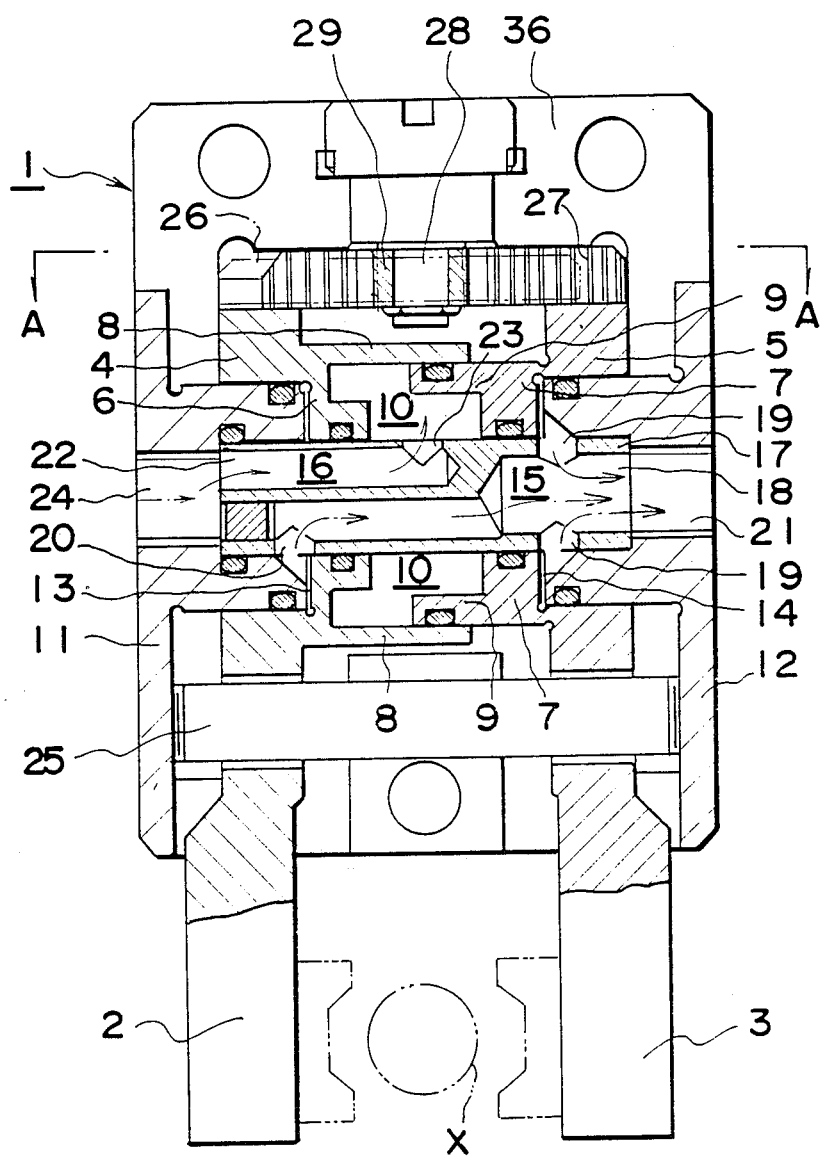
FIG. 2 is a vertical cross-sectional view of the gripping apparatus in accordance with the present invention returning from the gripping stage.
Figure 3:
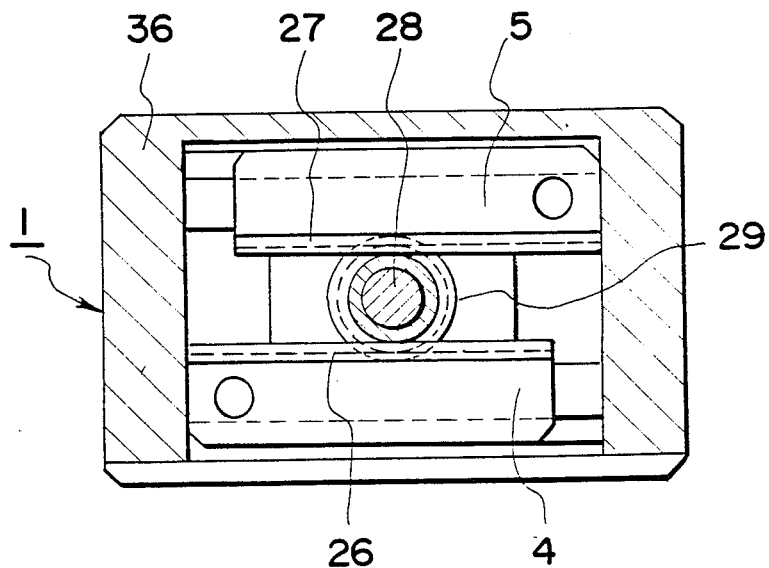
FIG. 3 is a cross-sectional view taken on line A—A of FIG. 2.

Needless to say, in the present invention, the rear end parts 4 and 5 of the respective jaw elements 2 and 3 may be differently contained within the body 36 so that the respective jaw element 2 and 3 may operate as opposed to each other without being limited to the above mentioned embodiments as shown in FIGS. 1 and 2. For example, the above mentioned gripping operation may be made by using air pressure, and the above mentioned return operation may be made by a spring interposed between the pistons or pawls.

Racks 26 and 27 are formed respectively on the outer surfaces of the interior jaw parts 4 and 5 in opposition to each other. A pinion 29, borne on a stub shaft 28 within the body 36, is interposed between and meshes with the respective racks 26 and 27. According to the present invention, as the respective racks 26 and 27 are opposed to each other and the single pinion 29 is interposed between them, when one jaw element 2 and 3 moves, the pinion 29 will be caused to rotate, so that even if only one piston 6 or 7 is pushed or pressure is unevenly applied, the other will be directly moved in the reverse direction. The respective jaw elements 2 and 3 are thus synchronized to operate in opposition to each other. That is to say, they will slide symmetrically.

According to the present invention, as distinguished from the conventional apparatus, the meshing surfaces are reduced to as few as two, that is, one between one rack 26 and the above mentioned one pinion 29 and one surface between the other rack 27 and the above mentioned one pinion 29. Therefore, the backlash is small and the precise control of the gripping operation is high.

Also, according to the present invention, as distinguished from the conventional apparatus, only a single pinion 29 is required and therefore there are advantages in that the apparatus is economical and can be made small.

Further, according to the present invention, as the respective racks 27 and 28 are opposed to each other, but are not arranged in the same plane, there are advantages that, though the thickness of the apparatus increases, the width of the apparatus can be made narrow and, in this sense too, the apparatus can be made small.

What is claimed is:

1. Apparatus for handling workpieces comprising a housing having an internal compartment, a pair of jaw elements, each of said jaw elements including an inner part disposed in said housing and an outer part extending from said housing, said outer part of each jaw element defining a respective gripping finger, said inner part of each jaw element being integrally formed with a rack meshing with a common pinion gear rotatably carried in said housing, a chamber guide shaft disposed transversely in said compartment and having at least one inlet port for the admittance of a pressurized fluid, said jaw element being integrally formed with piston means connecting the inner and outer parts thereof and being configured to have an inner face and an outer face, said piston means being supported by and slidable on said chambered shaft in such manner whereby the respective piston means are in opposed relation, one to the other, and the respective outer faces of said piston means are in communication with the inlet port whereby when the pressurized fluid is applied thereto, each of the jaw elements are forced toward each other and the associated racks move reversely, one to the other on said pinion, thereby causing the fingers to close in synchronous manner.

2. The apparatus according to claim 1, including means for returning each of said jaw elements to an open position.

3. The apparatus according to claim 2, wherein said return means includes a second input port to said chambered shaft for the admittance of a pressurized fluid thereto whereby when the pressurized fluid is applied to said second inlet, the pressurized fluid is communicated to the inner face of the respective piston forcing the same to move apart whereby the fingers separate, one from the other, in synchronous manner.

4. The apparatus according to claim 2, said return means including spring means for normally biasing each of said jaw elements to a separated position.

* * * * *

UNITED STATES PATENT AND TRADEMARK OFFICE
CERTIFICATE OF CORRECTION

PATENT NO.   :   4,865,301
DATED        :   Sept. 12, 1989
INVENTOR(S)  :   Yoji ISE It is certified that error appears in the above-identified patent and that said Letters Patent is hereby corrected as shown below:

Title page:

[30]  FOREIGN APPLICATION PRIORITY DATA

Feb. 28, 1987 .....[JP]......JAPAN .........62-29737

Signed and Sealed this

Twenty-first Day of August, 1990

Attest:

HARRY F. MANBECK, JR.

*Attesting Officer*         *Commissioner of Patents and Trademarks*